United States Patent [19]
Murata et al.

[11] Patent Number: 5,691,766
[45] Date of Patent: Nov. 25, 1997

[54] VIDEO CAMERA WITH VENTED LIGHT

[75] Inventors: Yukiko Murata; Mutsumi Inuma, both of Kanagawa-ken; Junichi Doi, Tokyo, all of Japan

[73] Assignee: Canon Kabushiki Kaisha, Tokyo, Japan

[21] Appl. No.: 558,760

[22] Filed: Nov. 15, 1995

Related U.S. Application Data

[63] Continuation of Ser. No. 112,556, Aug. 26, 1993, abandoned.

[30] Foreign Application Priority Data

Sep. 4, 1992 [JP] Japan .................................. 4-262872
Sep. 7, 1992 [JP] Japan .................................. 4-238362

[51] Int. Cl.$^6$ ............................................ H04N 7/04
[52] U.S. Cl. ........................... 348/370; 396/177; 362/6; 362/373
[58] Field of Search ....................... 354/149.11, 419; 348/370, 371, 375, 374, 376; 362/6, 3, 285, 218, 294, 373; H04N 7/04

[56] References Cited

U.S. PATENT DOCUMENTS

| | | | |
|---|---|---|---|
| 256,974 | 4/1882 | Carbutt | 362/269 |
| 1,600,840 | 7/1926 | Murphy et al. | 362/261 |
| 4,554,621 | 11/1985 | Corrigan | 362/3 |
| 4,760,509 | 7/1988 | Panagiotou | 362/294 |
| 4,860,108 | 8/1989 | Saito et al. | 348/370 |
| 5,153,624 | 10/1992 | Haraguchi | 354/149.11 |
| 5,155,596 | 10/1992 | Kurtz et al. | 354/370 |
| 5,202,720 | 4/1993 | Fujino et al. | 354/149.11 |
| 5,208,675 | 5/1993 | Wilson et al. | 348/370 |

*Primary Examiner*—Michael Horabik
*Assistant Examiner*—Michael Day
*Attorney, Agent, or Firm*—Robin, Blecker, Daley & Driscoll

[57] ABSTRACT

A video camera (31) has a built-in video light (32) for photography in the dark. The built-in video light (32) has heat dissipation holes (32f1) capable of opening and closing, and a heat dissipation control for controlling opening and closing of the heat dissipation holes according to the stowage operation by a stowage control.

11 Claims, 8 Drawing Sheets

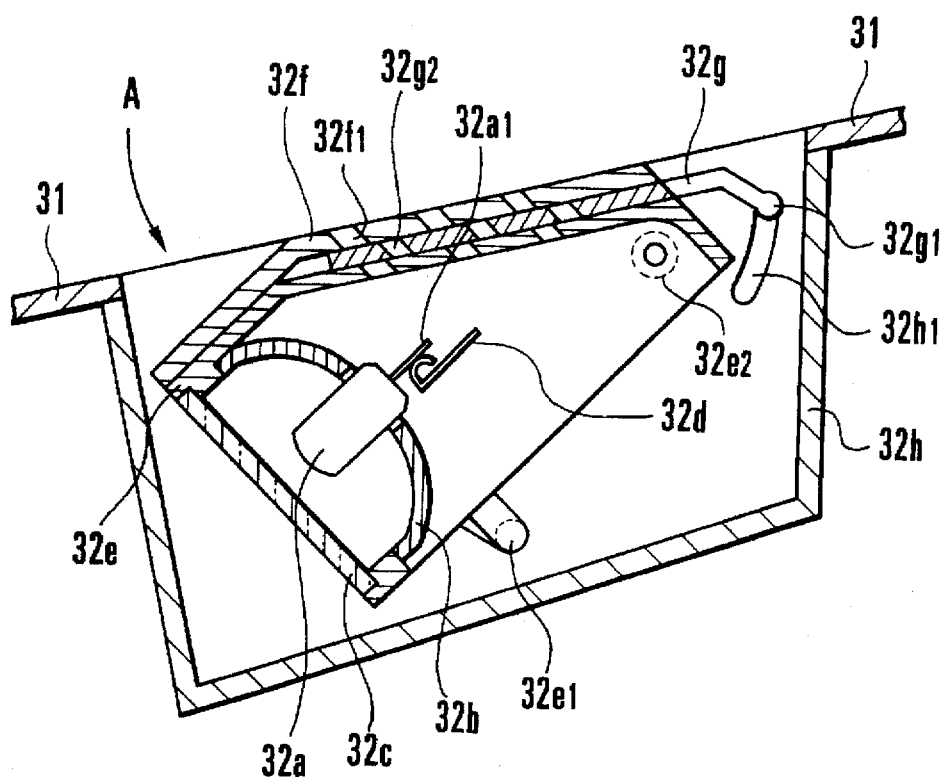

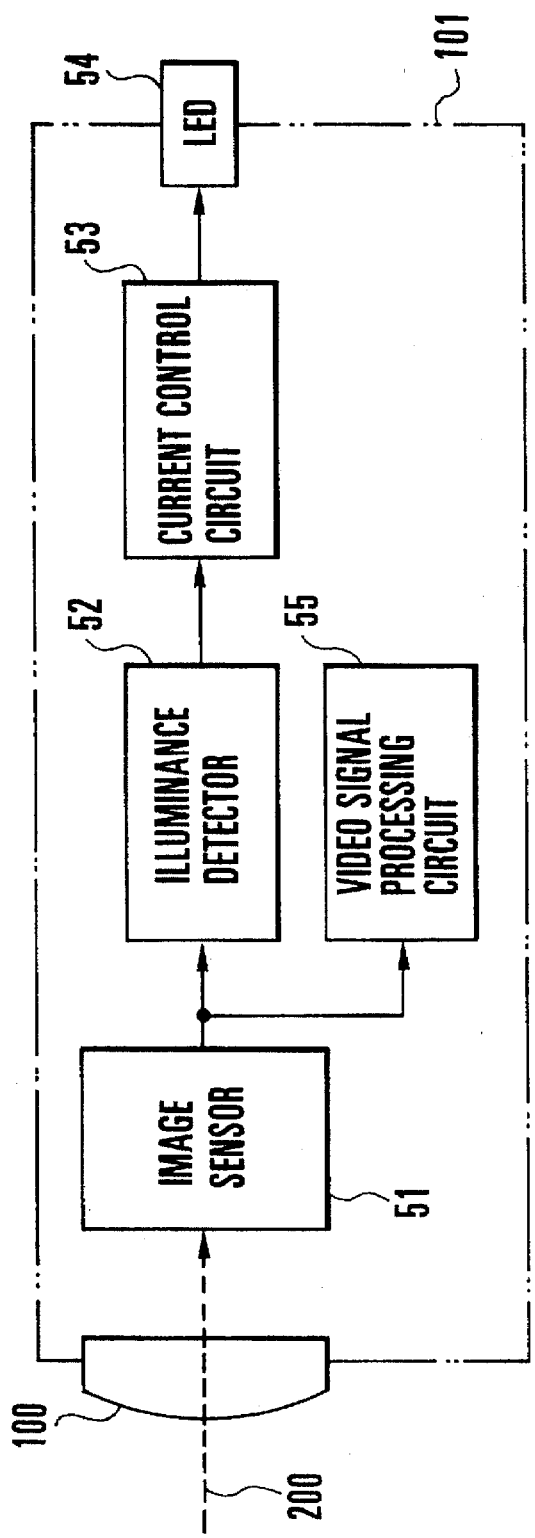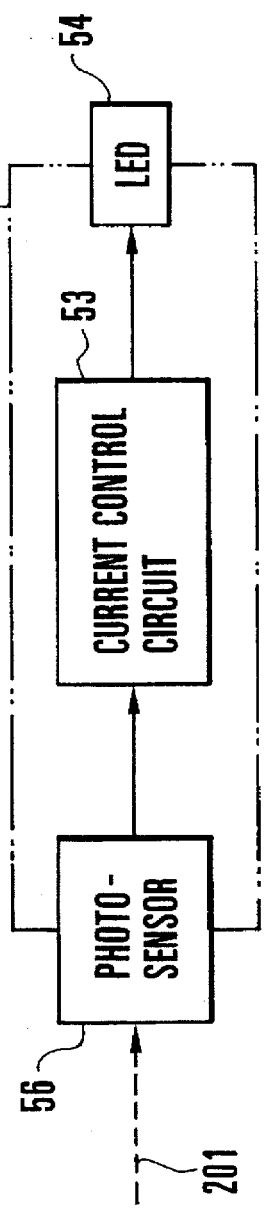

5,691,766

VIDEO CAMERA WITH VENTED LIGHT

This is a continuation application under 37 CFR 1.62 of prior application Ser. No. 08/112,556, filed Aug. 26, 1993, now abandoned.

BACKGROUND OF THE INVENTION

1. Field of the Invention

The present invention relates to an imaging apparatus with a built-in lighting means enabling photography at night or in the dark.

2. Description of the Related Art

FIG. 1 shows an example of components of this kind of conventional imaging apparatus. In this imaging apparatus, a video light 21 is mounted on a camera body 1 via a mounting member 14 such as an accessory shoe so as to assist in photography in the dark. A battery 10 is attached to the video light 21, thus supplying power to the video light 21. Photography at night or the like is enabled by turning on the video light 21.

As for mounting the video light 21 in the foregoing conventional imaging apparatus, the video light 21 is mounted or demounted every time it is used. The mounting or demounting is a nuisance. It therefore takes much time to make preparations for photography.

Dark current noise induced in a solid-state image sensor such as a charge coupled device (CCD) tends to increase as the temperature of the CCD rises. In an imaging apparatus using such a CCD, image quality deteriorates markedly, especially, when photography is performed with low illuminance in the dark or the like.

FIG. 2 shows an example of components of an imaging apparatus, wherein the video light 21 is of the built-in type. In FIG. 2, reference numeral 2 denotes a lens. 3 denotes an image sensor. 4 denotes a video signal processing circuit. 6 denotes an electronic viewfinder (EVF).

When the video light 21 is of the built-in type, however, as shown in FIG. 2, after the video light 21 is used, the remaining heat 23 propagates through the camera body 1. As a result, the temperature rise in the image sensor 3 or a CCD is accelerated. The CCD whose temperature has risen causes image quality do deteriorate.

SUMMARY OF THE INVENTION

Accordingly, an object of the present invention is to provide an imaging apparatus in which a nuisance of setting a video light for photography is alleviated.

In terms of the above object, the present invention provides as one embodiment an imaging apparatus comprising an apparatus body and a lighting means capable of being stowed in the apparatus body.

Another object of the present invention is to provide an imaging apparatus that resolves the aforesaid problems and is free from an adverse effect resulting from the remaining heat of a video light.

In terms of the above object, the present invention provides as one embodiment an imaging apparatus comprising an apparatus body and a lighting means capable of being stowed in the apparatus body. Herein, the apparatus body has heat dissipation holes in the vicinity of the stowage of the lighting means.

Yet another object of the present invention is to provide an imaging apparatus capable of preventing rain drops or the like from invading into an imaging apparatus body.

Other objects and features of the present invention will be apparent from the detailed description of the embodiments of the invention with reference to the drawings.

BRIEF DESCRIPTION OF THE DRAWINGS

FIG. 11 is a sectional view showing the video light in the second embodiment and its surrounding components in a state in which the video light is stowed;

FIG. 12 is an oblique view showing a major portion of the video light in the second embodiment;

FIG. 13 shows an example of components required for detecting an illuminance by using an image sensor in the third embodiment of the imaging apparatus of the present invention;

FIG. 14 shows an example of components for detecting an illuminance by using a photosensor in the third embodiment of the imaging apparatus of the present invention;

DETAILED DESCRIPTION OF THE PREFERRED EMBODIMENTS

The first embodiment of an imaging apparatus of the present invention will be described in conjunction with FIGS. 3 to 8. In the embodiments below, the present invention is implemented in a camera-integrated type VTR.

Figure 1:
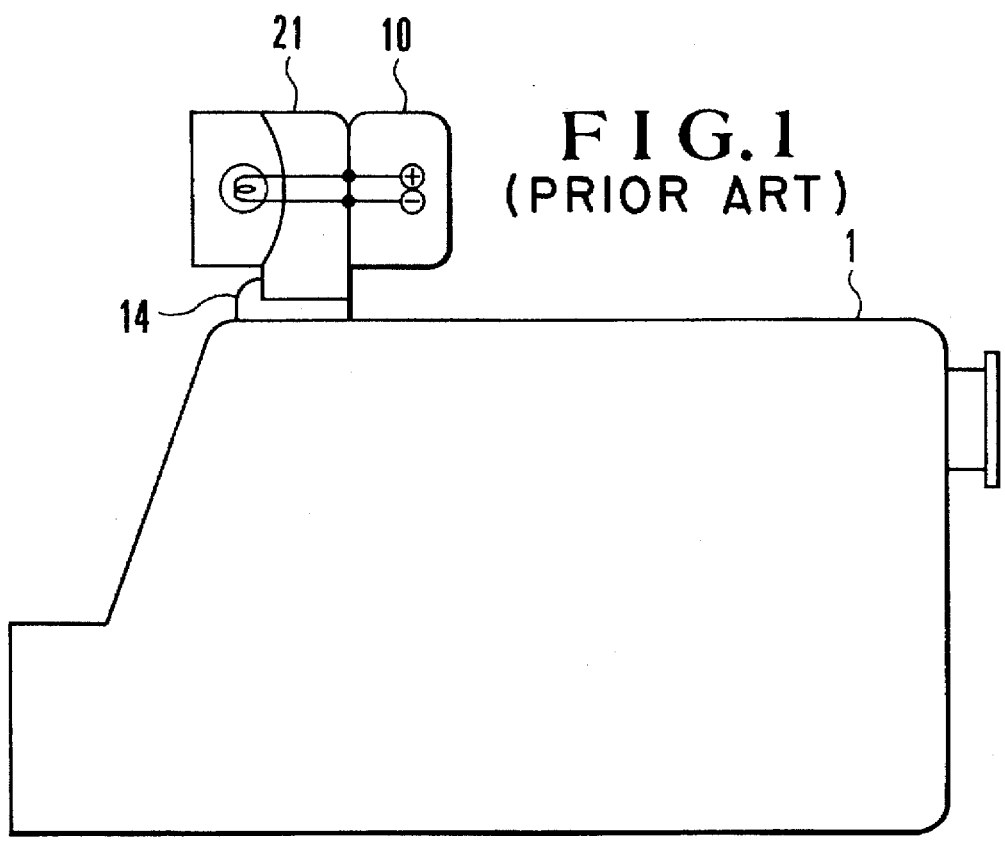
FIG. 1 schematically shows an example of components of an imaging apparatus with a conventional built-in video light.
Figure 2:
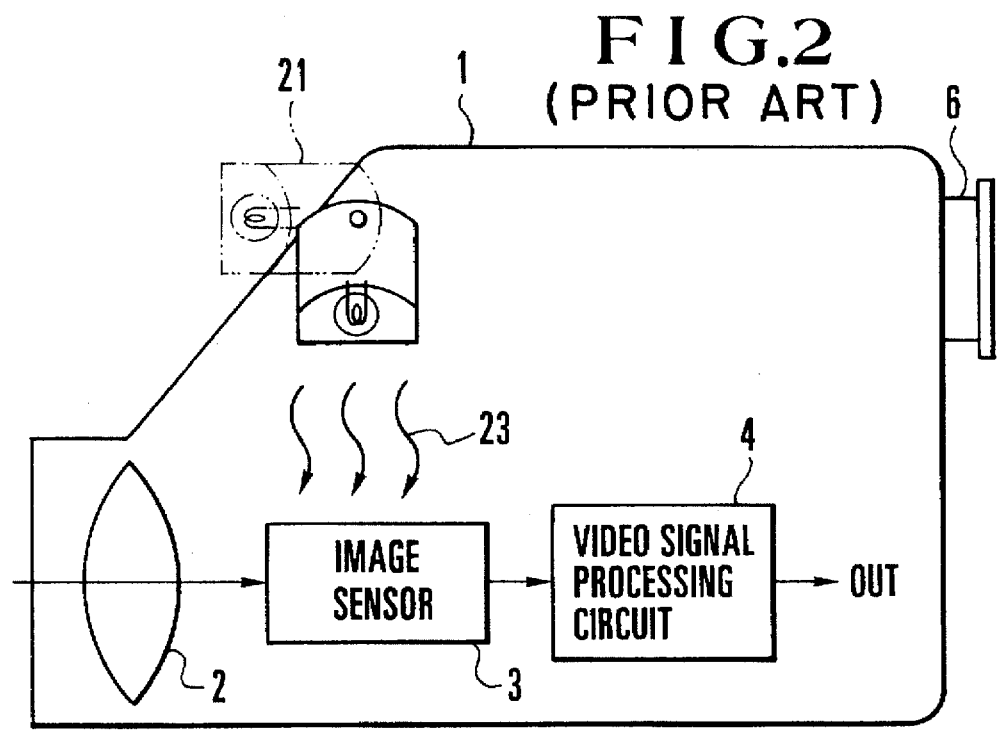
FIG. 2 is a diagram for explaining the positional relationship between a video light and an image sensor in the conventional imaging apparatus, and the action of heat dissipation.
Figure 3:
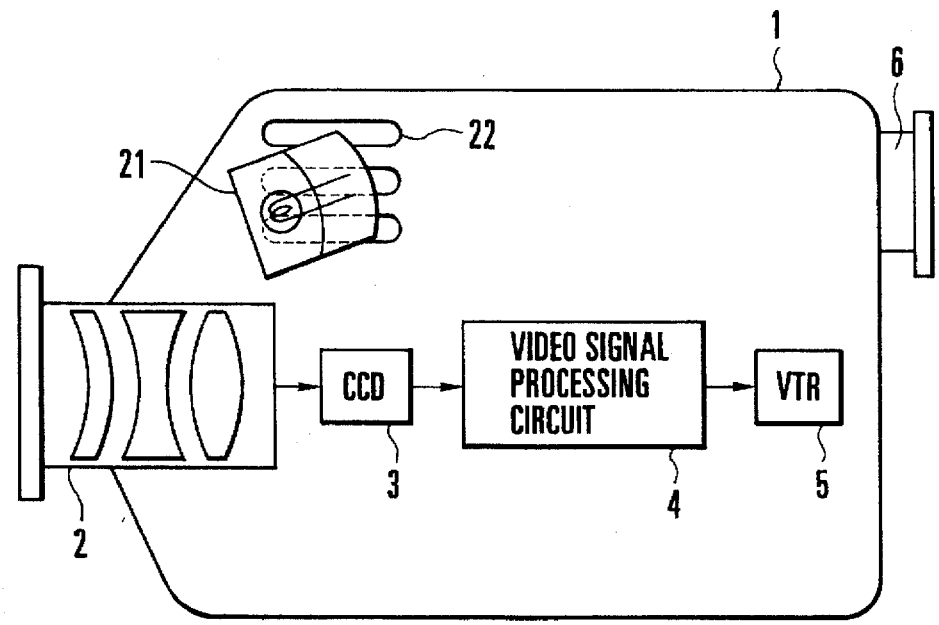
FIG. 3 schematically shows all the components of the first embodiment of the imaging apparatus of the present invention.

As shown in FIG. 3, a camera body 1 has a built-in video light 21. A plurality of heat dissipation holes 22 are bored in the camera body 1 so that they will coincide with the location of the video light 21 stowed.

An object image formed by a lens 2 is photoelectrically transferred by an image sensor 3 such as a CCD, and then subjected to specified processing by a video signal processing circuit 4 so that it will be converted into a video signal of a format suitable for the recording carried out in a succeeding stage. The video signal is recorded by a recording unit (VTR) 5.

Figure 4:
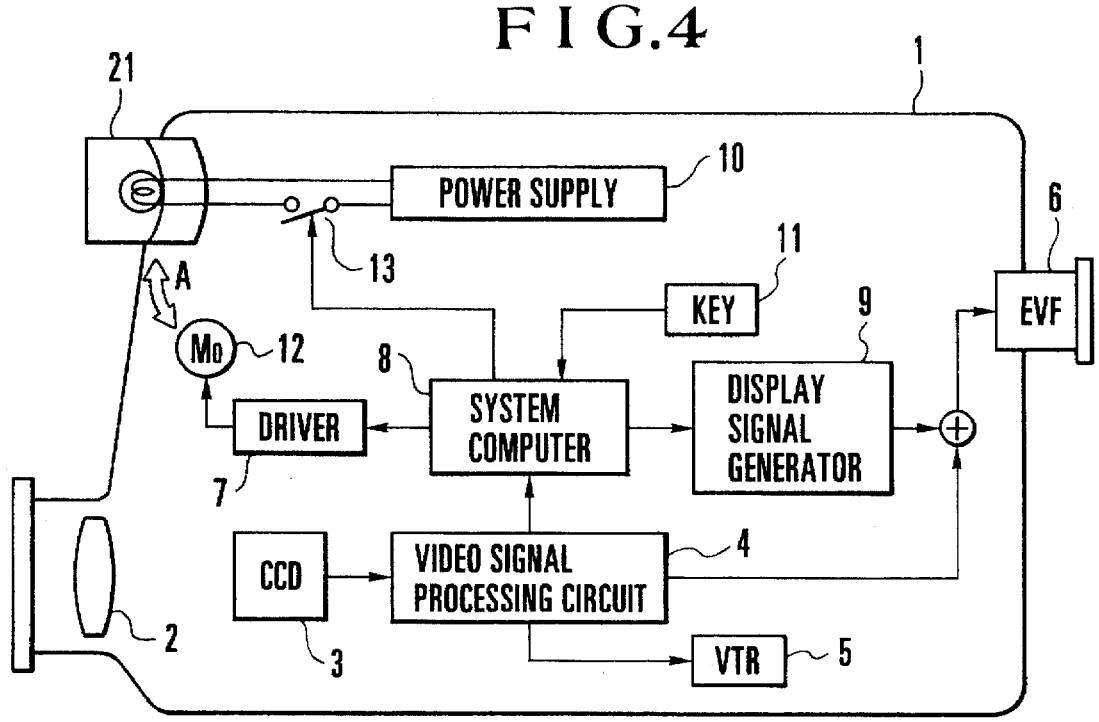
FIG. 4 shows an example of electric components relating to the first embodiment of the imaging apparatus of the present invention.

Connection of the video light 21 to a power supply is, as shown in FIG. 4, performed inside the camera body 1. Specifically, as shown in FIG. 4, the video light 21 is connected to a power supply 10 via a switch 13. The make or break of the switch 13 is controlled by a system computer 8 depending on the hand-operation of a key 11 disposed at an appropriate position on the camera body 1. Due to this mechanism, the on or off operation of the video light 21 can be controlled directly in the camera body 1.

In this embodiment, the video light 21 is electrically driven by a motor 12 (see an arrow A). Specifically, when the key 11 is hand-operated, the system computer 8 operates a driver 7 and the motor 12 in order to set or stow the video light 21 at a specified position. The on or off state of the video light 21 is indicated in an electronic viewfinder 6 in response to a display signal generated by a display signal generator 9.

Figure 5:
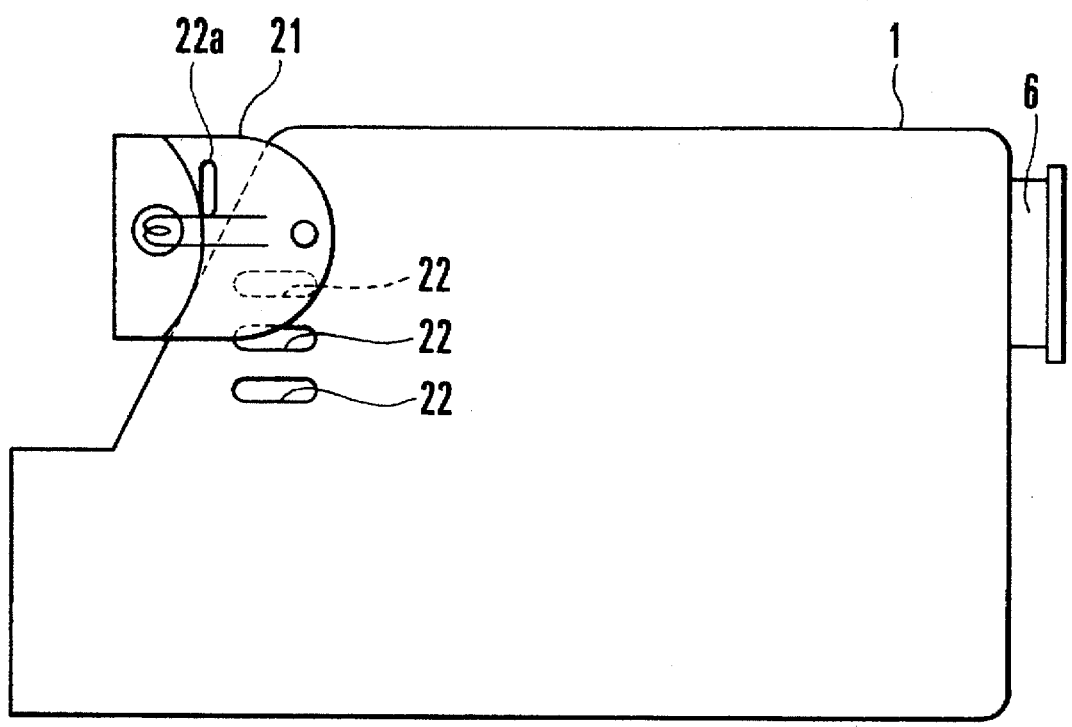
FIG. 5 shows a state in which a video light is used in the first embodiment of the imaging apparatus of the present invention.

When in use, the video light 21 is driven by the motor 12 and set at a specified position so that the irradiating section thereof will be exposed to the outside of the camera body 1 (see FIG. 5). The video light 21 is then actuated for lighting, which enables photography in the dark.

Figure 6:
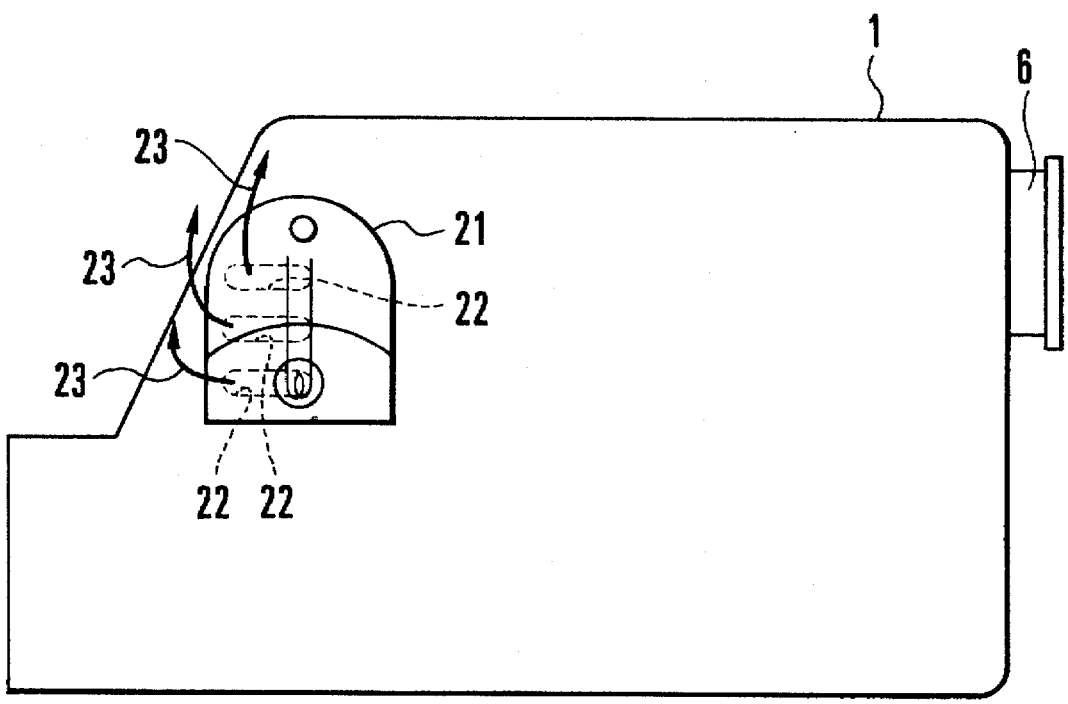
FIG. 6 shows a state in which the video light is stowed in the first embodiment of the imaging apparatus of the present invention.

After being used, the video light 21 is, as shown in FIG. 6, stowed in the camera body 1. At this time, the remaining heat 23 of the video light 21 is discharged outside the camera body 1 through the heat dissipation holes 22 as shown in FIG. 6. The video light 21 itself may have a heat dissipation hole 22a as shown in FIG. 5 in such a manner that when the video light 21 is stowed in the camera body 1, the heat dissipation hole 22a will coincide with any of the heat dissipation holes 22. In this case, the remaining heat 23 can be discharged through the heat dissipation holes 22 and 22a.

Figure 7:
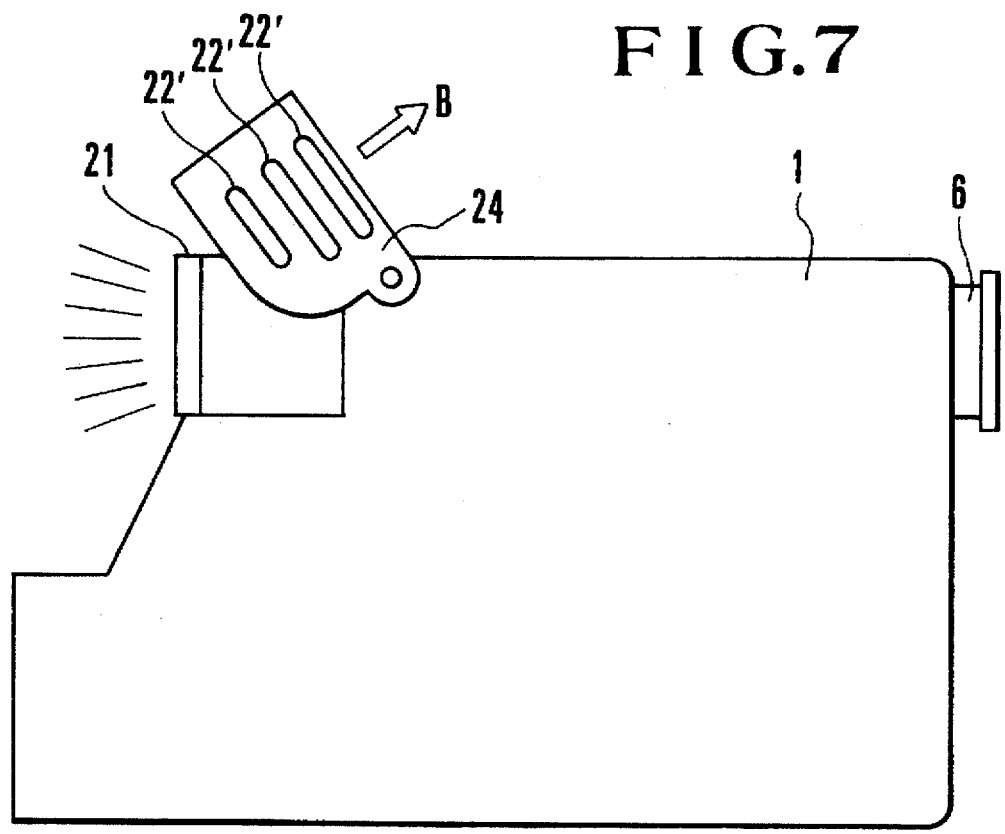
FIG. 7 shows another state in which the video light is used in the first embodiment of the imaging apparatus of the present invention.
Figure 8:
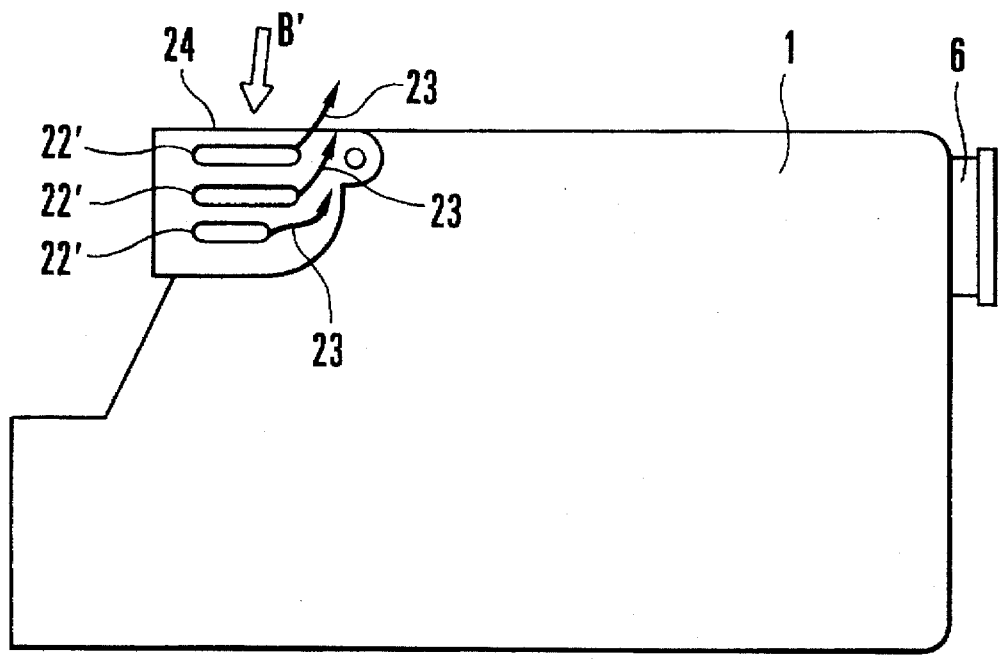
FIG. 8 shows another state in which the video light is stowed in the first embodiment of the imaging apparatus of the present invention.

The components of the video light 21 and the shapes of heat dissipation holes shown in FIGS. 7 and 8 are also conceivable.

As shown in FIGS. 7 and 8, the video light 21 is united with the camera body 1 at a specified position. A cover 24 for shielding the video light 21 pivots on the camera body 1. A plurality of heat dissipation holes 22' are bored in the side surface of the cover 24.

Owing to the foregoing components, when photography is attempted in the dark, the cover 24 is turned in an arrow-B direction in FIG. 7 and departed above from the camera body 1. The irradiating section of the video light 21 is then exposed. After the video light 21 is used, the cover 24 is turned back in an arrow-B' direction in FIG. 8 so as to shield the video light 21. The heat dissipation holes 22' are bored in the side surface of the cover 24 as mentioned above, which help to evacuate the remaining heat 23. The heat dissipation holes 22' may be bored in the body of the video light 21, which also provide the same advantages as those described above.

As described above, according to this embodiment, heat dissipation holes are bored in the stowage of a video light. The video light can therefore be incorporated in a camera body, a power supply can be connected inside the camera, and the on or off operation of the video light can be controlled directly in the camera body. This provides for simple hand-operation for photography.

In the aforesaid first embodiment, when heat dissipation holes are bored in the body of a video light, since the heat dissipation holes are open all the time irrelevant of whether or not the video light is in use, rain drops or the like invade into the body of a video camera, that is, a casing of the video camera, depending on a photographic situation in which photography is performed outdoor in the rain. This brings about a possibility that the invasion of rain drops leads to the damage or incorrect operation of the video camera.

A video camera, in which the foregoing problem lying in the first embodiment has been resolved, will be described as the second embodiment below.

Figure 9:
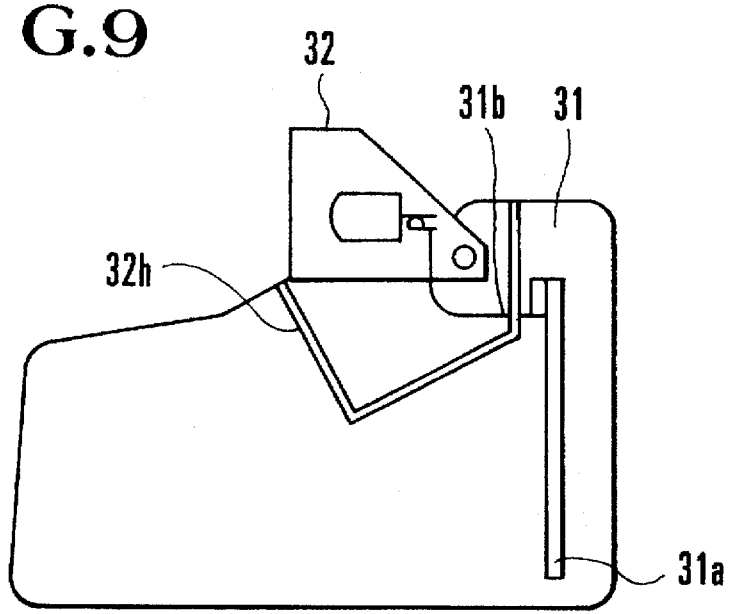
FIG. 9 is a sectional view showing the second embodiment of the present invention or a layout of a video camera with a built-in video light.
Figure 10:
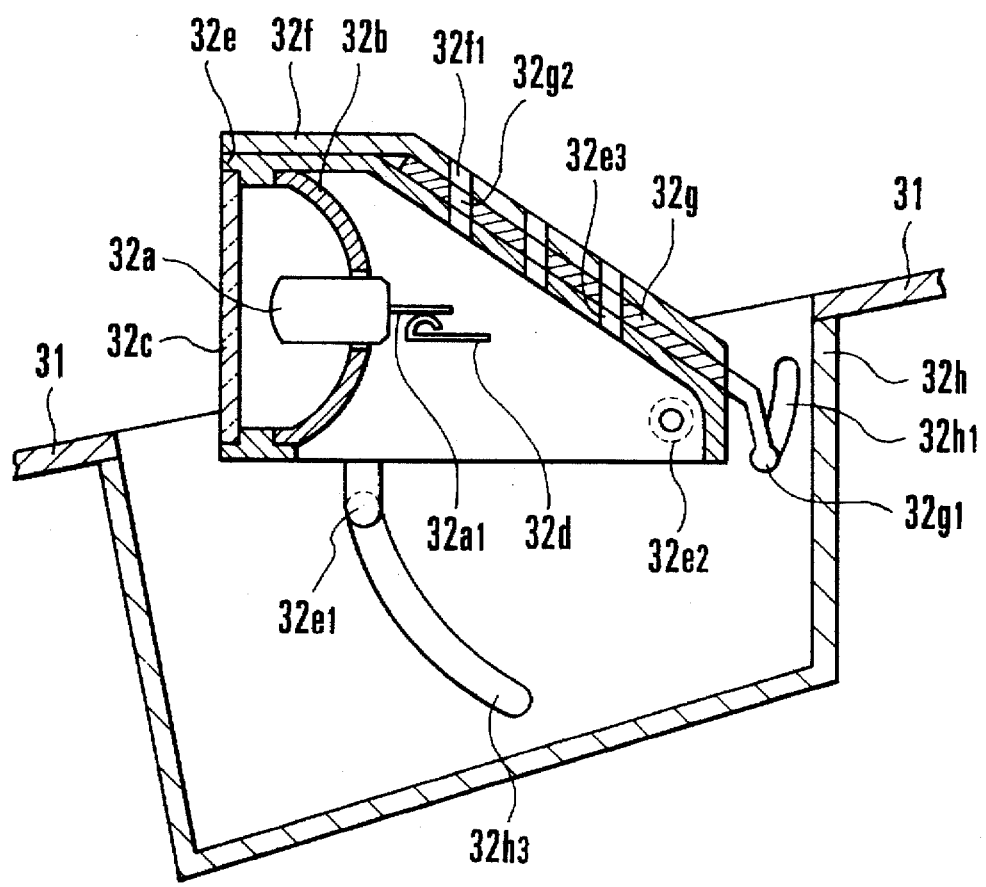
FIG. 10 is a sectional view showing the video light in the second embodiment and its surrounding components in a state in which the video light is used (projecting)

FIGS. 9 to 12 show the second embodiment of the present invention. FIG. 9 is a sectional view showing a layout of a video camera with a built-in video light. FIG. 10 is a sectional view showing a video light and its surrounding components in a state in which the video light is in use (projecting). FIG. 11 is a sectional view showing the video light and its surrounding components in a state in which the video light is stowed. FIG. 12 is an oblique view of a major portion of the video light.

In FIG. 9, reference numeral 31 denotes a camera body. 32 denotes a video light. When in use, as described in detail later, the video light 32 moves to a position shown in FIG. 9, projects from the camera body 31, and lights up. When the video light 32 is unused, it is stowed in the camera body 31 and does not light up. Turning on or off the video light 32 is realized by installing a detection means, which is not shown, such as a detection switch capable of detecting the position of the video light 32. When the detection means detects that the video light 32 lies at a position at which the video light 32 is supposed to be in used, the video light 32 is turned on. When the detection means detects that the video light 32 lies at a position at which the video light 32 is supposed to be stowed, the video light 32 is turned off.

Connection of the video light 32 to a power supply is identical to that in the aforesaid embodiment, of which description will therefore be omitted.

Next, referring to FIG. 10, the structure of the video light 32 in the camera body 31 in a state in which the video light 32 lights up will be described. A light cover 32f, which serves as a screen for protecting the video light 32 from outside, is fixed to a video light case (hereinafter, case) 32e while being spaced from the case 32e to such an extent that a screening member 32g, which will be described later, can move. An axis 32e2 formed on the case 32e is fitted into holes 32h2 (see FIG. 12) bored in a video light holder 32h (hereinafter, holder) in such a manner that it can rotate. A boss 32e1 formed on the case 32e slides within a stopper slot 32h3 bored in the holder 32h. At a position shown in FIG. 10, the boss 32e1 comes into contact with an end of the slot and is held still. At the position, the power supply of the video light 32 is turned on by means of a light position detection switch, which is not shown, or the like. A lamp 32a serving as a light source of the video light 32 lights up. Reference numeral 32d denotes a contact spring that is in contact with a terminal 32a1 of the lamp 32a and supplies power. The contact spring 32d is connected to a power supply circuit which is not shown. Light emitted from the lamp 32a is reflected with a specified angle by a reflecting plate 32b, and diffused and projected by a diffusing plate 32c.

A boss 32g1 formed on the screening member 32g slides within a guide slot 32h1 bored in the holder 32h with the movement of the video light 32. The screening member 32g moves to a position, which is determined by the position at which the boss 32g1 and the guide slot 32h1 engage with each other, between the case 32e and light cover 32f. In a state shown in FIG. 10 in which the lamp lights up, holes 32f1 bored in the light cover 32f, holes 32g2 bored in the screening member 32g, and holes 32e3 bored in the case 32e become consistent with one another. The heat dissipation holes on the top of the video light 32 are thus open. Heat generated by turning on the lamp 32a is discharged outside the video light 32 through these holes. Damage to the components inside the video light 32 incurring due to heat is therefore drastically reduced.

In FIG. 11, the structure of the camera body 31 in a state in which the video light 32 is off will be described. When the video light 32 is stowed as described previously by a driving means which is not shown, the case 32e rotates counter-clockwise with the axis 32e2 as a center in FIG. 11 and is held at a position shown in FIG. 11.

At this time, as described above, the boss 32g1 slides along the guide slot 32h1. With the sliding, the screening member 32g moves. When the video light 32 is stowed, the aforesaid holes 32f1, holes 32g2, and holes 32e3 become inconsistent with one another. The holes which are open when the video light 32 lights up are blocked when the video light 32 is stowed. In this state, even if photography is performed outdoors in the rain, rain drops will not invade into the camera body 31 because the video light 32 is stowed.

As is apparent from the above description, according to the second embodiment, the heat dissipation holes, which are open when the video light is in use, are blocked when the video light is unused. Even when photography is done outdoors and said video camera and said video light are unused, especially, in the rain, without using the video light 32, the inflow of rain drops into the video camera can be prevented. Consequently, the video camera can be saved from being damaged or operating incorrectly.

When a means for detecting the position of the video light is installed, the video light will automatically light up or go out depending on whether or not the video light is used.

Next, the third embodiment of the present invention will be described.

For reference, a lighting unit for this kind of imaging apparatus is oriented in the same direction as a lens and located behind the lens. A so-called pop-up type lighting unit is incorporated in an imaging apparatus and projects from the body of the imaging apparatus when needed. A lighting switch for the lighting unit formed on the body of the imaging apparatus may be colored differently from the other operation switches, so that the lighting switch will be distinguished from the other operation keys.

When photography is performed with low illuminnace, in particular, lighting is needed. Nevertheless, a photographer may not be aware of the necessity but may carry out photography with insufficient illuminance. Another problem is that it is hard to discern the position of the lighting switch with low illuminance.

According to the third embodiment, the lighting unit is actuated correctly with low illuminance, especially, in the dark or the like, and the actuation can be achieved easily and reliably.

FIG. 13 shows an example of the components of an imaging apparatus of the third embodiment. In FIG. 13, reference numeral 100 denotes a last lens of a photographic lens array. 101 denotes a video camera body. 200 denotes an image having passed through the photographic lens array.

In the imaging apparatus of the third embodiment, as shown in FIG. 13, the image 200 having passed through the lens 100 is converted into an electrical signal by an image sensor 51. An illuminance detector 52 calculates the surrounding illuminance of an object. A current control circuit 53 compares the calculated illuminance with a reference value and then controls the current to be flown through an LED 54. In FIG. 13, reference numeral 55 denotes a video signal processing circuit.

When photography is attempted with low illuminance, the LED 54 lights up. With the light of the LED 54, a photographer is prompted to actuate the lighting unit. When photography is attempted with low illuminance, in particular, the lighting unit can be actuated without fail. Correct photography can therefore be guaranteed.

As shown in FIG. 14, a photosensor 56 capable of receiving external light 201 may be located properly in the video camera body 101, so that the photosensor 56 will detect a surrounding brightness. In this variant, voltage proportional to the detected surrounding brightness is generated. The current control circuit 53 compares the voltage value with a reference value, and then controls the current to be flown through the LED 54. Similarly to the aforesaid embodiment, when photography is attempted with low illuminance, the LED 54 lights up.

Figure 15:
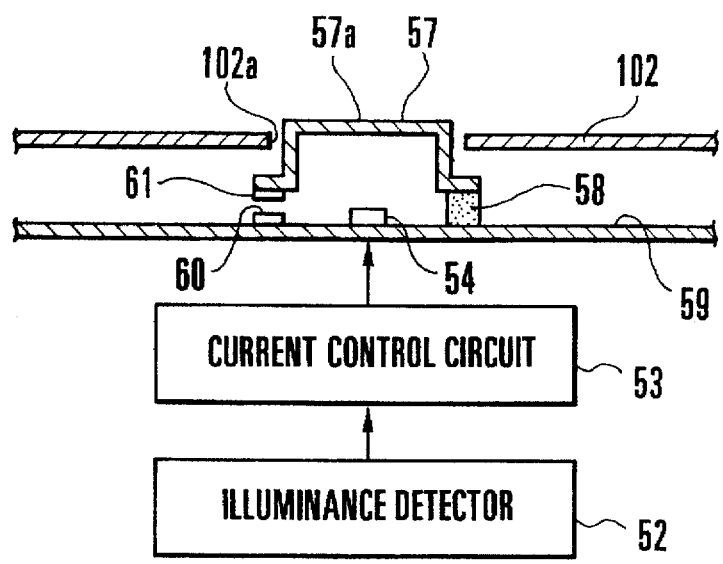
FIG. 15 shows an example of components concerning a lighting switch for actuating a lighting unit relating to the third embodiment of the imaging apparatus of the present invention.

FIG. 15 shows an example of the components of a lighting switch for actuating the lighting unit in the aforesaid embodiment.

As described above, the illuminance detector 52 calculates the surrounding illuminance of an object. Based on the result of the calculation, the current control circuit 53 controls the current to be flown through the LED 54. A switch button 57 is held elastically on a printed circuit board 59, on which the LED 54 is mounted, with an elastic member 58 between them. The switch button 57 is held elastically on the printed circuit board 59 in such a manner that a pair of mutually-opposed contacts 60 and 61 will be formed on part of the printed circuit board 59 and part of the switch button 57, respectively. The switch button 57 is made of, for example, a translucent synthetic resin such as polyacetal. A head 57a of the switch button 57 projects through a hole 102a bored in a casing 102 of the video camera body 101.

When the LED 54 is located under the switch button 57, the light of the LED 54 becomes visible through the translucent switch button 57. When the switch button 57 is pressed to actuate the lighting unit with low illuminance, the location of the switch button 57 can be discerned effortlessly. The lighting unit can therefore be turned on quickly and reliably. By pressing the switch button 57, the contacts 60 and 61 are placed in the conducting state. The lighting unit then lights up.

Figure 16:
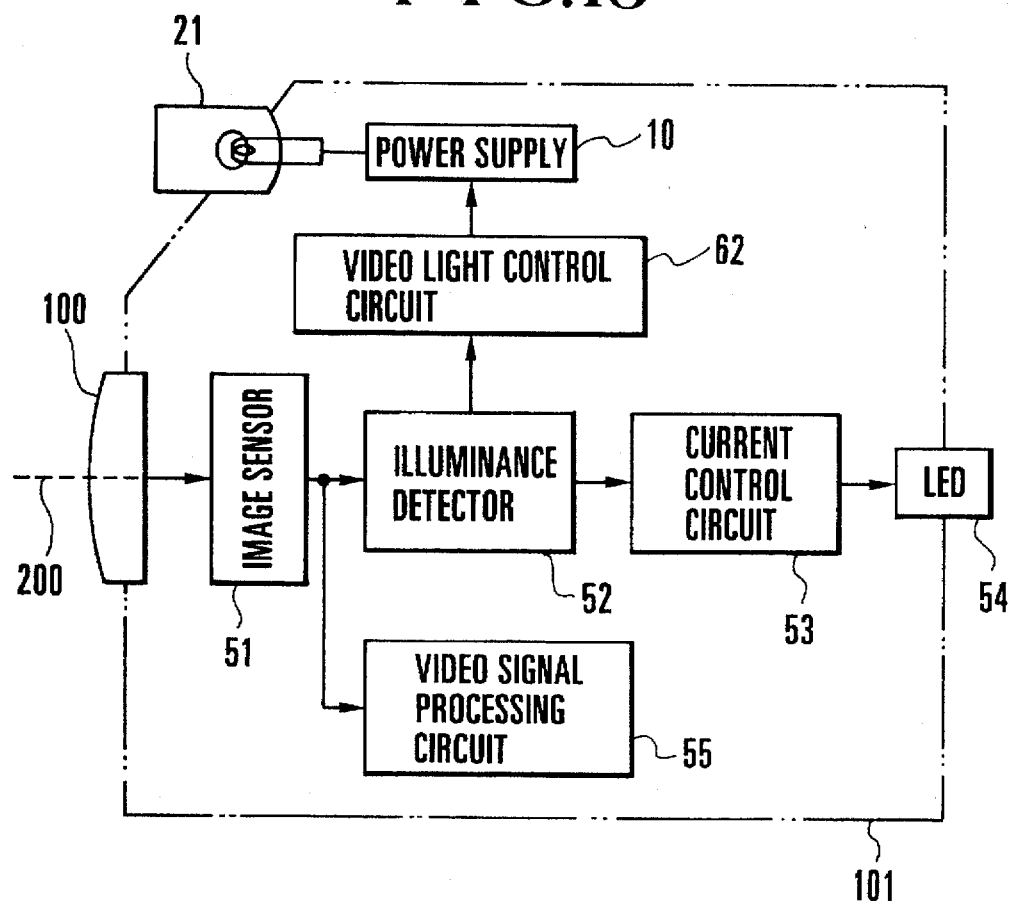
FIG. 16 is a diagram for explaining the control of brightness of the video light in the third embodiment.

Alternatively, the brightness of the video light 21 may be varied depending on the surrounding illuminace of an object. In this variant, as shown in FIG. 16, a video light control circuit 62 controls the voltage of a power supply 10 according to the output of an illuminance detector 52. This makes it possible to change the brightness of the video light 21. Photography can therefore be performed with appropriate brightness of the video light 21 dependent on external illuminance calculated by the illuminance detector 52.

What is claimed is:

1. An electronic apparatus, comprising:
   (a) an apparatus body;
   (b) lighting means capable of being stowed in said apparatus body, wherein said lighting means having a heat dissipation hole formed therein, which is arranged to be capable of opening or closing;

(c) stowage control means for controlling the stowage of said lighting means in said apparatus body; and (d) heat dissipation control means for controlling opening or closing operation of said heat dissipation hole according to stowage operation by said stowage control means.

2. An apparatus according to claim 1, wherein said apparatus body has a heat dissipation hole formed adjacent to a portion in which said lighting means is stowed.

3. An apparatus according to claim 1, further comprising detecting means for detecting a surrounding illuminance of an object, and lighting control means for controlling a brightness of said lighting means according to a detection output of said detecting means.

4. An apparatus according to claim 3, further comprising indicating means for indicating the surrounding illuminance of the object according to the detection output of said detecting means.

5. An electronic apparatus, comprising:

(a) an apparatus body;

(b) lighting means capable of being stowed in said apparatus body;

(c) a heat dissipation hole which is arranged to be capable of opening or closing; and (d) control means for controlling an opening or closing operation of said heat dissipation hole according to whether said lighting means is stowed in said apparatus or not.

6. An apparatus according to claim 5, further comprising control means for controlling moving of said lighting means between a stowed position and non-stowed position in said apparatus body according to whether said lighting means is used or unused.

7. An apparatus according to claim 5, further comprising detecting means for detecting a surrounding illuminance of an object, and lighting control means for controlling a brightness of said lighting means according to a detection output of said detecting means.

8. An apparatus according to claim 7, further comprising indicating means for indicating the surrounding illuminance of the object according to the detection output of said detecting means.

9. An electronic apparatus, comprising:

(a) an apparatus body;

(b) lighting means capable of being stowed in said apparatus body, wherein said lighting means having a heat dissipation hole formed therein, which is arranged to be capable of opening or closing; and (c) control means for controlling opening or closing operation of said heat dissipation hole according to whether said lighting means is stowed in said apparatus body or not.

10. An apparatus according to claim 9, further comprising detecting means for detecting a surrounding illuminance of an object, and lighting control means for controlling a brightness of said lighting means according to a detection output of said detecting means.

11. An apparatus according to claim 10, further comprising indicating means for indicating the surrounding illuminance of the object according to the detection output of said detecting means.

* * * * *